United States Patent Office 2,794,288
Patented June 4, 1957

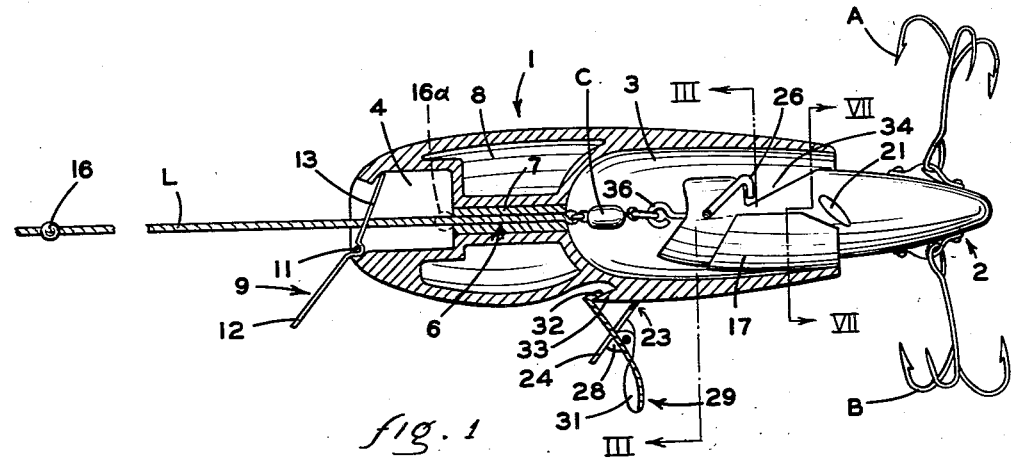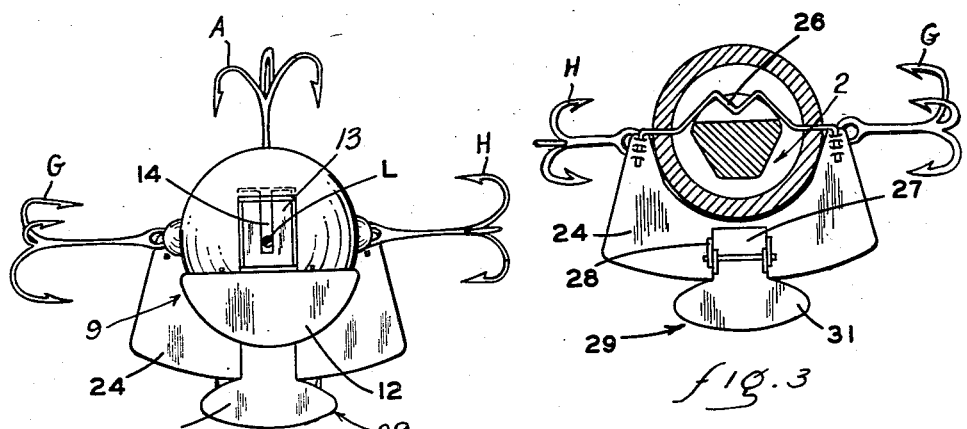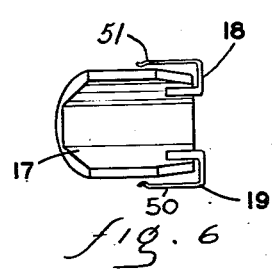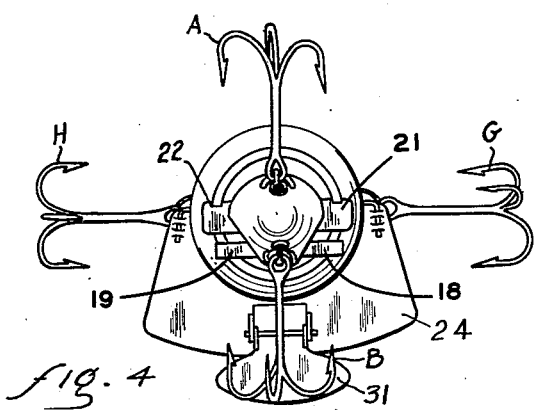

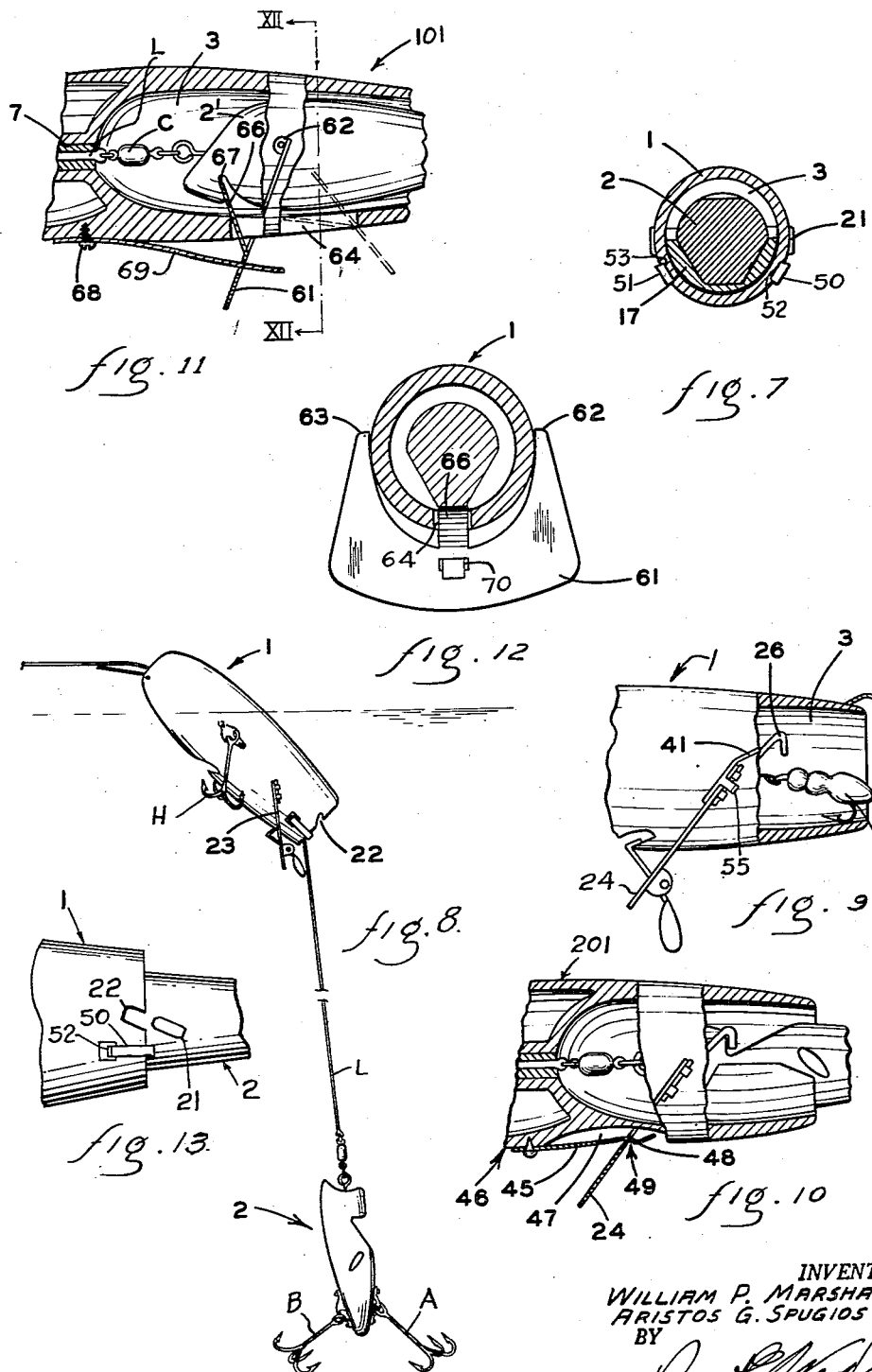

2,794,288

FISH LURE HAVING SECONDARY LURE WITHIN PRIMARY LURE

William P. Marshall and Aristos G. Spugios, Kalamazoo, Mich.

Application July 20, 1954, Serial No. 444,596

6 Claims. (Cl. 43—42.11)

This invention relates to an artificial bait for fishing and particularly to a type thereof having a secondary lure normally contained within the body of the primary lure, the two being automatically separable after being cast into the water.

It has been observed that a fish, under certain conditions, will often follow a short distance behind a bait but will not take it. It has also been found that, where a fish will not strike at a single bait, it can be induced to strike at one of two baits in tandem, the one traveling a short distance, as two feet, behind the other. It appears that the fish is attracted by the first bait and he commences following it. The second bait being relatively closer, he may be induced to seize it sooner than he would if the first bait were the only one present.

Further, it is possible by providing two baits in tandem to produce a series of attractive gyrations of the second bait which are impossible when only one bait is being pulled through the water.

These factors have long been well known, but the inconvenience of throwing a pair of lures connected in tandem with respect to each other has reduced their use in the usual casting procedures. Accordingly, a principal object of the invention has been to provide a device by which a double artificial bait can be thrown with all the convenience and accuracy, and in the manner of a single bait but which will, upon striking the water, separate into a pair of lures connected in tandem.

A further object of the invention has been to provide a bait, as aforesaid, which will be sufficiently sturdy to resist rough usage and which will be accurate and reliable in its operation as above mentioned.

A further object of the invention is to provide a bait, as aforesaid, in which the secondary bait will be drawn a predetermined distance behind the first bait, which distance may be readily adjusted by the fisherman from time to time during the fishing procedure.

A further object of the invention is to provide a device, as aforesaid, in which the gyrations of the secondary bait will be a composite of its own gyrations and those of the primary bait, whereby to provide an extremely complex, and therefore attention attracting series of movements.

Other objects and purposes of the invention will be apparent to persons acquainted with devices of this general type upon reading the following description and inspection of the accompanying drawings, in which:

Figure 1 is a central cross sectional view of the bait with a secondary lure in position within the primary lure, in elevation.

Figure 2 is a front elevational view of the device.

Figure 3 is a section taken on the line III—III of Figure 1.

Figure 4 is a rear elevational view of the device.

Figure 5 is a side elevational view of a liner associated with the primary lure.

Figure 6 is a top elevational view of the liner shown in Figure 5.

Figure 7 is a section taken on the line VII—VII of Figure 1.

Figure 8 shows the primary and secondary lures in tandem.

Figure 9 is a fragment of Figure 1 showing a modification of the invention.

Figure 10 discloses a partial sectional view of a further modification.

Figure 11 is a partial central sectional view similar to Figure 10 showing a further modification.

Figure 12 is a section taken on the line XII—XII of Figue 11.

Figure 13 is a partial side view of the bait shown in Figure 1, showing the secondary lure spaced slightly outwardly from its normal assembled position within the primary lure.

In meeting the objects and purposes above set forth, we have provided a fish bait having a primary lure 1 and a secondary lure 2. The primary lure has a chamber 3 within the rearward portion thereof for the reception of the secondary lure 2.

The primary lure 1 is of generally elongated and rounded contour. The primary lure can be made in any desired or convenient form and may be provided with conventional external hooks G and H. Said primary lure has a forwardly opening chamber 4 at its forward end and said rearwardly opening chamber 3 at its rearward end. A connecting passageway 6 is provided therebetween, which passageway may be lined by a suitable bearing sleeve 7, as of nylon, for reasons appearing hereinafter. Float chamber 8 is provided intermediate the end chambers 3 and 4 for reasons hereinafter appearing.

A flat, line controlling member, or catch, 9 is pivotally mounted by the pin 11 upon the lower wall of the chamber 4 near its forward end. The lower part of the member 9 is widened with respect to the upper part as best indicated in Figure 2 to provide a water engaging vane 12. The upper, or trigger part 13 of said member 9 is provided with a central slot 14 (Figure 2) which opens through the upper edge thereof and is of sufficient width to permit the passage of the line L therethrough. Said line L carries a bead 16 thereon, which bead is of diameter such that it will not pass through said slot 14.

The secondary lure 2 may have non-floating characteristics and is shaped as desired for convenience and appearance. It will carry conventional hooks thereon as desired, but said hooks will be located at the rearward end thereof, as indicated at A and B. Said secondary lure 2 is preferably of non-circular cross section, as indicated in Figures 3 and 7. Said chamber 3 is, therefore, made non-circular in cross section either by molding, cutting or by use of a liner 17. Said liner, where used, will have a cylindrical external surface and a non-cylindrical internal surface to fit the outer surface of the secondary lure. A pair of clips 18 and 19 are provided for fixing said liner to the primary lure. The clips 18 and 19 are secured to the liner 17 and have legs 50 and 51 spaced outwardly from, and extending axially of, the outer surface thereof. The end portion of the wall defining chamber 3 is received between the outer surface of the liner 17 and the legs of clips 18 and 19. The ends of the legs 50 and 51 are received in recesses 52 and 53 (Figures 7 and 13) in the outer surface of the primary lure 1. When the secondary lure 2 is within the chamber 3 (Figures 1 and 4), the clips 18 and 19 are below the vanes 21, as appearing in Figure 4, and the secondary lure is received within the liner 17 between said clips 18 and 19.

A pair of sloped vanes 21 extend from the opposite sides of the secondary lure 2 and are received, as shown in Figure 13, into similarly shaped slots 22 on either side of the primary lure near the rearward end thereof. The vanes 21 add to the motion of the secondary lure in the water and assist in locking the secondary lure tightly with respect to the primary lure when the two are intended to be fastened together.

A trigger 23 is positioned intermediate the ends of the primary lure and is pivotally connected to the opposite sides thereof. Said trigger comprises a trigger vane 24 externally pivoted upon the lure 1. Trigger hook 26 is attached to vane 24 and extends through the wall and chamber 3 of lure 1 and pivotally supports the vane 24 on the lure 1. The lower end of the trigger vane 24 has a rectangular opening 27 therein extending through its lower edge and a pair of ears 28 turned downwardly therefrom. A secondary trigger 29 has a pair of ears thereon which pivotally cooperate with the ears 28 of the trigger vane 24. Said secondary trigger also has a trigger vane portion 31 and a secondary trigger hook 32. The lower portion of the primary lure 1 has a trigger hook lip 33 formed therein for engaging the secondary trigger hook 32 when the trigger vane 24 is in the position shown in Figure 1. The upper portion of the secondary lure 2 has depressed portion 34 therein for engaging the trigger hook 26 when the trigger vane 24 is in its forward position.

Thus, when the secondary lure is in the position shown in Figure 1, the hook 26 will engage the forward edge of the depressed portion 34 and the secondary trigger hook 32 will engage the lip 33. A suitable connection, including a swivel C, is provided for connecting an eye 36 on the secondary lure to the rearward end of the line L.

The modification disclosed in Figure 9 provides a closure flap 40 which may be mounted by means of the arms 41 upon the upper end of the trigger vane 24. The arms 41 are mounted on the upper end of the pivotally mounted trigger vane 24 by a connecting flange 55. Thus, when the vane 24 is in its forward position, the flap 40 will close the rearward chamber 3 and thereby prevent escape of an artificial fly 42 from within said chamber 3. The fly 42, comprising the secondary lure of this modification, is connected to the swivel C in a conventional manner.

The modification shown in Figure 10 provides an alternate structure which replaces the secondary trigger 29 and the opening 27 in the vane 24. An elongated, metal strip 45 is secured to the bottom wall 46 of the primary lure 201 and extends over a recess 47 in the bottom portion of the wall 46. The extended end of said strip 45 is provided with a hump 48, which is engageable by the inner edge 49 of the vane 24 when said edge 49 is adjacent said bottom 46 and said vane 24 is in its forward position. The strip 45 is flexible and the frictional engagement of the vane 24 by the strip 45 will depend upon certain factors discussed hereinafter.

*Operation*

In operation, the line L is first threaded through the slot 14 and the passageway 6, and then secured, as by the swivel C, to the eye 36 of the secondary lure 2. Thereafter, the bead 16 is positioned on the line L so that it is spaced from the eye 36 the distance desired between the primary and secondary lures. The parts are then arranged in the position shown in Figure 1 and the bait is ready for casting. Upon a cast being completed, the bait is drawn by the line L abruptly toward the fisherman. As the bait passes through the water, the secondary vane 31 is urged rearwardly until the hook 32 is disengaged from the lip 33 and thereby releases the secondary trigger 29. This permits the water to urge the vane 24 backwardly for releasing the engagement between the trigger hook 26 and the secondary lure 2. After such initial pull, the primary lure is allowed to float motionless on the water for a moment during which period the secondary lure, being heavier than water, will sink downwardly while the primary lure floats in an inclined position, as shown in Figure 8, due to the float chamber 8. As said secondary lure sinks downwardly, the bead 16 will engage upper portion 13 of the catch member 9 and pivot it about pin 11 until the upper portion does not block movement of the bead. The bead will be drawn rearwardly past the split upper portion 13 of the member 9 until said bead 16 occupies the position shown in broken lines at 16a in Figure 1. The weight of the vane 12, and the reaction of member 9 with the water through which it is drawn, will tend to return the member 9 to the position shown in Figure 1. As the fisherman commences to reel the bait toward him, the line L will drag against the vane 12, as shown in Figure 8, and cause the upper portion 13 to block the passage of the bead 16. The primary lure will accordingly be moved forwardly through the water with the secondary lure trailing behind. Due to the engagement between the bead and the member 9, which becomes engaged in the chamber 4 in the position shown in Figure 1, and the action of the water against the vane 12, the lures are virtually locked in their tandem position and they can be drawn at any desired rate toward the fisherman. The vane 12 will also provide an irregular motion in the movement of the primary lure.

The secondary lure will follow at the end of the line L and it will have both the effect of the irregular motion supplied by the gyrations of the primary lure 1 together with those additional gyrations of its own provided by the angular vanes 21.

Upon recovery of the bait, it is necessary only to pivot the member 9 rearwardly until the bead 16 can be passed over the split in the upper part 13 of the member 9. The secondary lure can then be returned into position within the body of the primary lure. The vanes 21 are again located in the slots 22, and the trigger 23 is moved forwardly to locate the hook 26 into the opening 34 and the hook 32 over the lip 33, whereupon the bait is again ready for casting.

In the modification of Figure 10, the vane 24 is moved forwardly in the body 201, as described above, until the inner edge 49 thereof snaps over the hump 48 in the flexible strip 45. The bait in this modified form is then ready for casting. The initial forward movement of the primary lure through the water will disengage the vane 24 from the strip 45 and permit the sequence described above to occur as the secondary lure moves downwardly and the two lures are then reeled in.

As modified in Figure 9, the secondary lure 2 may be replaced by a fly 42. The flap 40 over the otherwise open end of the chamber 3 prevents escape of the fly 42 from said chamber until the cast is complete. The flap 40 functions in place of the trigger hook 26 which would not normally work with flies.

Figures 11 and 12 show another modification. In this form an internal chamber 3 is provided in the primary lure 101 in substantially the same manner as previously and the line L extends rearwardly through the bearing member 7 and connects to the secondary lure 2' through the swivel C as before. Here, however, a vane 61 is provided in place of the previous vane 24. The vane 61, as shown in Figure 12, is of substantially U-shape form with a trigger 66 extending upwardly from its midportion and the vane is pivotally fastened at its free ends 62 and 63 to the outside of the primary lure 101 of the bait. A slot 64 is provided through the bottom of the primary lure to permit the trigger 66 to extend therethrough and engage the notch 67 in the lower surface of the secondary bait 2'. A leaf spring 69 is fastened at 68 to the lower side of the primary lure 101 and extends rearwardly through a slot 70 in the vane 61. Said spring 69 engages the part 61 and holds the trigger 66 in the notch 67 as shown in Fig. 11. However, when the bait is pulled through the water in the same manner as above set forth with the form shown in Figures 1 to 10 inclusive, the vane 61 is pulled backwardly and the secondary bait 2 is released.

While we have set forth for illustrative purposes plural particular embodiments of our invention, it will be understood that many variations will be apparent to those acquainted with devices of this general type and the hereinafter appended claims are intended to include such devices excepting as said claims by their own terms expressly require otherwise.

We claim:

1. In an artificial fishing bait, the combination comprising: an elongated primary lure having a chamber formed therein; fish catching means mounted on the external surface of said primary lure and extending away from said primary lure; an elongated secondary lure of a size adapted to be received within said chamber; fish catching means mounted on the external surface of said secondary lure; releasable trigger means for normally holding said secondary lure within said chamber, said trigger means having a movably mounted vane positioned externally of, and extending generally transverse to the longitudinal axis of, said primary and secondary lures, said vane being movable in response to movement of said primary lure through the water to cause release of said trigger means to thereby release said secondary lure from said chamber; line means connected to said secondary lure and said primary lure whereby said primary and secondary lures may be cast as a single unit and then separated and drawn toward the fisherman as a pair of tandem spaced lures.

2. The device defined in claim 1 wherein said primary lure has also a second chamber opening forwardly thereof and a line catch pivoted at the lower edge of said second chamber, said line catch having a trigger portion extending within said second chamber and a vane portion extending outwardly therefrom, the trigger having an opening therein normally adapted to pass a fishing line therethrough and a bead on said line having a greater diameter than the width of said opening; whereby upon sufficient separation of said lures said bead will be carried rearwardly past said trigger and then upon again being drawn forwardly will engage said trigger and pull said primary lure through the water.

3. The device defined in claim 1 including a trigger hook mounted on opposite wall portions of said chamber and having a portion extending through a wall portion thereof to a point outwardly of said chamber, said primary lure having a trigger portion connected to said trigger hook for pivotal movement relative to said primary lure, and a depressed portion in said secondary lure cooperating with said trigger hook for normally holding said secondary lure within said chamber; a secondary trigger affixed to said trigger portion at a pivot point for pivotal movement with respect to said trigger portion and having a vane on one side of said pivot point and having a trigger hook on the other side of the pivot point; and a projecting lip on said primary lure cooperable with the last-named hook for normally holding said trigger hook in position to engage said secondary lure; said secondary trigger being disengageable from the lip and thereby permitting disengagement of said trigger hook from said secondary lure upon said primary lure being drawn through the water.

4. The device defined in claim 1 wherein said secondary lure has a pair of vanes extending sidewardly therefrom and said primary lure has a pair of rearwardly opening slots in the side walls of said chamber for receiving said vanes when said secondary lure is placed in said chamber 5. The device defined in claim 1 wherein the external cross section of said secondary lure and the internal cross section of that portion of said chamber which engages said secondary lure is non-circular but matching with respect to each other so that said secondary lure will be received snugly within the chamber within said primary lure and will be in non-rotatable relationship therewith.

6. The device defined in claim 1 said device having an opening through the primary lure in the lower part of the chamber thereof directly below the position of the secondary lure when the secondary lure is in the chamber, a substantially U-shaped vane pivotally affixed at its free ends to the outside of said primary lure and said vane having a trigger extending from a central portion thereof through said opening to engage a notch in the lower portion of the secondary lure, and a resilient element normally holding said vane in such position that the trigger element thereon extends into said notch.

References Cited in the file of this patent

UNITED STATES PATENTS

| | | |
|---|---|---|
| 1,345,173 | Halder | June 29, 1920 |
| 1,434,204 | Grounsell | Oct. 31, 1922 |
| 2,292,743 | Cordry | Aug. 11, 1942 |
| 2,435,011 | Mason | Jan. 27, 1948 |
| 2,609,633 | Cracker | Sept. 9, 1952 |

OTHER REFERENCES

| | | |
|---|---|---|
| 584,826 | Great Britain | Jan. 23, 1947 |